US005632842A

United States Patent [19]

Oliver et al.

[11] Patent Number: 5,632,842

[45] Date of Patent: May 27, 1997

[54] BUSINESS FORM WITH REMOVABLE LABEL AND METHOD OF MAKING SAME

[75] Inventors: Mark W. Oliver, Schaumburg; George F. Zehner, Crystal Lake, both of Ill.

[73] Assignee: Uarco Incorporated, Barrington, Ill.

[21] Appl. No.: 526,417

[22] Filed: Sep. 11, 1995

[51] Int. Cl.[6] .......... B32B 31/18; B42D 15/10

[52] U.S. Cl. .......... 156/268; 156/270; 156/253; 283/101; 283/81

[58] Field of Search .......... 156/253, 268, 156/270, 278, 275.7, 324.4, 269; 283/101, 81, 103, 105; 427/208.8

[56] References Cited

U.S. PATENT DOCUMENTS

| | | | |
|---|---|---|---|
| 4,214,024 | 7/1980 | Jacobson | 428/41 |
| 4,379,573 | 4/1983 | Lomeli et al. | 428/40 |
| 4,627,994 | 12/1986 | Welsch | 428/41 |
| 4,664,416 | 5/1987 | Steidinger | 282/11.5 A |
| 4,833,122 | 5/1989 | Doll et al. | 503/226 |
| 4,865,669 | 9/1989 | Schmidt | 156/91 |
| 4,876,131 | 10/1989 | Ashby et al. | 428/42 |
| 4,890,862 | 1/1990 | Buchholz | 283/62 |
| 4,932,684 | 6/1990 | Vermeulen | 283/81 |
| 4,938,507 | 7/1990 | Ashby et al. | 282/9 R |
| 4,940,690 | 7/1990 | Skees | 503/206 |
| 4,971,364 | 11/1990 | Templet | 283/70 |
| 4,995,642 | 2/1991 | Juszak et al. | 283/105 |
| 5,006,191 | 4/1991 | Schmidt | 156/268 |
| 5,011,559 | 4/1991 | Felix | 156/257 |
| 5,031,939 | 7/1991 | Webendorfer et al. | 283/81 |
| 5,039,652 | 8/1991 | Doll et al. | 503/206 |
| 5,090,942 | 2/1992 | Traise | 462/66 |
| 5,098,759 | 3/1992 | Felix | 428/42 |
| 5,129,682 | 7/1992 | Ashby | 283/81 |
| 5,135,789 | 8/1992 | Schmidt | 428/42 |
| 5,193,850 | 3/1993 | Lombardo | 281/2 |
| 5,249,827 | 10/1993 | Olson | 283/36 |
| 5,254,381 | 10/1993 | Hoffmann et al. | 428/40 |
| 5,267,898 | 12/1993 | Doll et al. | 462/6 |
| 5,271,787 | 12/1993 | Hoffmann et al. | 156/268 |
| 5,279,875 | 1/1994 | Juszak et al. | 428/42 |
| 5,282,649 | 2/1994 | Williams et al. | 283/56 |
| 5,284,689 | 2/1994 | Laurash et al. | 428/40 |
| 5,318,326 | 6/1994 | Garrison | 283/101 |
| 5,324,153 | 6/1994 | Chess | 412/9 |
| 5,328,208 | 7/1994 | Garrison | 283/105 |
| 5,328,538 | 7/1994 | Garrison | 156/249 |
| 5,343,647 | 9/1994 | Bulka | 40/630 |
| 5,366,410 | 11/1994 | Lombardo | 462/6 |

*Primary Examiner*—David A. Simmons
*Assistant Examiner*—Linda L. Gray
*Attorney, Agent, or Firm*—Wood, Phillips, VanSanten, Clark & Mortimer

[57] ABSTRACT

A method for making a labeled business form comprising a paper web having thereon a full length adhesive band covered by a release liner where the width of the release liner is substantially equal to or greater than the width of the adhesive band and where the adhesive band has a width less than the width of the paper web. The method includes die cutting the paper web to form individual labels, neutralizing any adhesive extending beyond the release liner, and transversely cutting the paper-adhesive-liner combination to form individual business forms.

23 Claims, 2 Drawing Sheets

FIG. 4
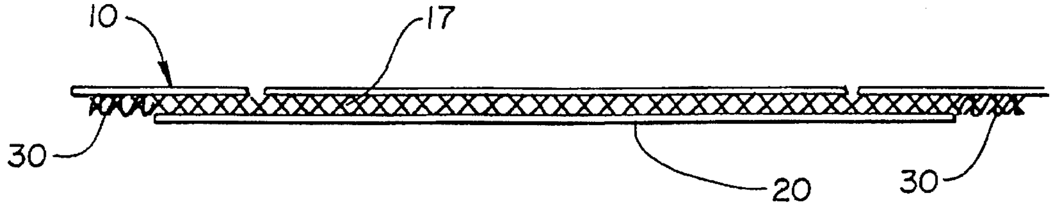
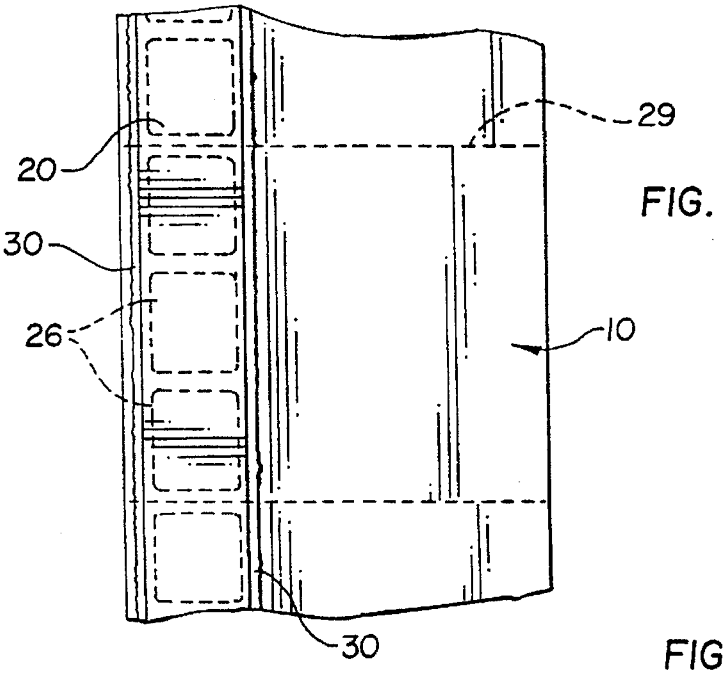
FIG. 5
FIG. 6
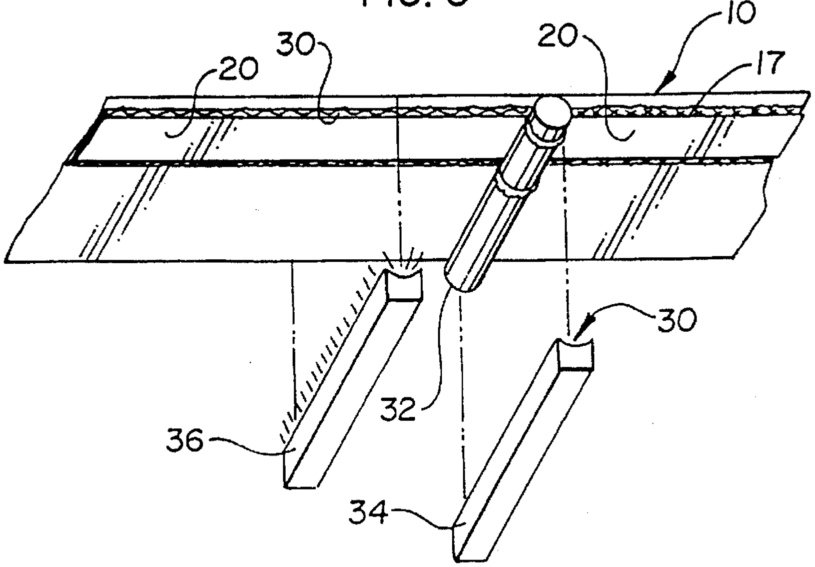

BUSINESS FORM WITH REMOVABLE LABEL AND METHOD OF MAKING SAME

FIELD OF THE INVENTION

This invention relates to a process for the manufacture of business forms bearing one or more removable, pressure-sensitive labels. This invention also relates to business forms bearing one or more removable, pressure-sensitive labels made from this particular process.

BACKGROUND OF THE INVENTION

Business forms with removable pressure-sensitive labels are well-known in the art. One common form of manufacturing these labels involves applying adhesive to a paper web by the use of transfer tape. U.S. Pat. No. 4,379,573 discloses a business form with labels made from a paper ply and a piece of transfer tape.

It is also known in the art to apply adhesive directly to the paper web in the areas where the labels are outlined by attenuated lines, and to adhere the single coated release liner on these label spots. U.S. Pat. No. 5,011,559 discloses a form with labels wherein the adhesive is applied to the back of the sheet in the area of the label, and covered with a release liner.

The above methods of manufacturing forms each have their own inherent disadvantages.

Forms made with the use of transfer tape have a tendency to curl. Additional care is needed to flatten these forms. This care involves an extra step in the manufacturing process and added expense to the consumer. Transfer tape is an expensive material to use in production of removable labels on business forms. Transfer tape is expensive because it can have two sides coated with silicone or a removable silicone coated backing which becomes waste after the tape is applied. Transfer tape is usually purchased by a business form manufacturer from a transfer tape producer, and must be stored on the business form production premises until it is needed.

U.S. Pat. No. 5,011,559 applies pressure sensitive adhesive directly to the paper web and, in order to prevent excess adhesive from seeping out from between the web and the liner (which excess adhesive can gum up machinery during manufacture and printers during use), this structure significantly spaces the edge of the adhesive inwardly from the release liner edge. As a result, the edge of the liner of these forms can bend away from the paper, causing the business forms to jam in office equipment, thus reducing the utility of such business forms. The business form also can have an uneven consistency along the length of the document, which causes misfeeds and paper jams in office equipment. Another drawback to this method of construction is that the business form and the resulting label have a ragged look and less aesthetic appearance.

The present invention is directed toward overcoming one or more of the problems discussed above.

SUMMARY OF THE INVENTION

In one aspect of the present invention, a method for making a labeled business form is disclosed. The first step of this method is to apply pressure sensitive adhesive in a continuous manner to one side of the paper web in a width less than that of the web. A release liner is then applied to the web on the continuous length of adhesive. The release liner has a width substantially equal to the width of the band of adhesive and an adherence to the adhesive which is significantly less than the paper web's adherence to the adhesive. Next, labels are die cut in the paper web. The web-adhesive-liner composite is then cut to define individual form sheets, each having the release liner extending their length.

In another aspect of the present invention, a flat business form having at least one removable adhesive label is produced using the above method.

In another aspect of the present invention, a method is disclosed for producing a business form wherein pressure sensitive adhesive is applied to the web in a continuous band having a width greater than the width of the release liner. The liner is then mounted to the web on the continuous length of adhesive such that adhesive lies exposed on the paper web along at least one edge of the liner. The exposed adhesive is next neutralized or deadened so that it is no longer sticky.

In another aspect of the present invention, a flat business form having at least one removable adhesive label is produced using the above method. The form has at least one removable pressure sensitive adhesive backed label and includes a release liner extending the entire length of the form. The liner adheres to the back of the form by way of the adhesive, which extends beyond at least one edge of the liner along the entire length of the form. The exposed adhesive is neutralized and therefore non-sticky.

It is an object of the invention to provide a reliable method for manufacturing business forms. It is a further object of the invention to provide an inexpensive method of producing business forms having a flat, wrinkle-free and aesthetically pleasing appearance.

It is a further object of the present invention to produce business forms which may be reliably used and will not damage office machines during use.

It is still another object of the present invention to provide a method of reliably making a wide variety of business forms having removable labels to meet the various needs of different business forms users.

BRIEF DESCRIPTION OF THE DRAWINGS

FIG. 4 is similar to FIG. 3, but shows a form produced by a second embodiment of the present invention;

FIG. 5 shows the back of the form shown in FIG. 4; and

FIG. 6 is a perspective view of an adhesive neutralizing device useable with a preferred embodiment of the invention.

DESCRIPTION OF THE PREFERRED EMBODIMENT

Figure 1:
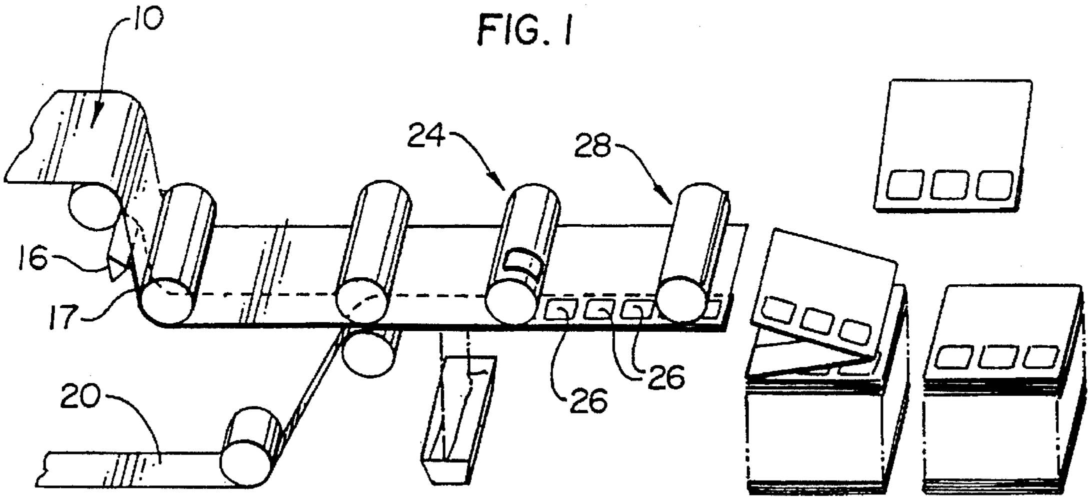
FIG. 1 is a perspective view of the stages of the process of this invention.
Figure 2:
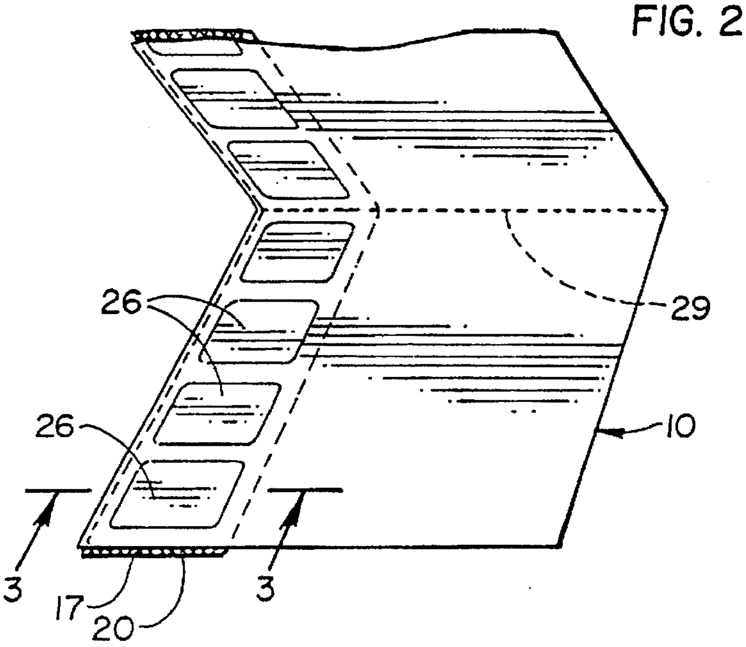
FIG. 2 is a perspective view of one embodiment of the product formed by the invention.
Figure 3:
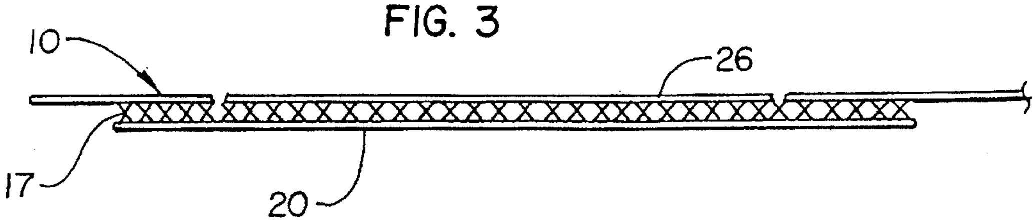
FIG. 3 shows a cross sectional view of the line 3—3 of FIG. 2.

In one preferred form of the present invention illustrated in FIGS. 1–3, an adhesive applicator 16 coats the paper web 10 continuously with a band of adhesive 17 having a selected width. A continuous release liner 20 has a suitable coating (such as silicone) on one side which is significantly less adherent to the adhesive 17 than the paper web 10 and is applied to the paper web 10 over the applied adhesive 17. In the preferred form of FIGS. 1–3, the liner 20 has a width substantially equal to the adhesive coating 17 on the paper web 10 and is attached to the paper web 10 in a continuous length. That is, the adhesive coating 17 on the paper web as applied has side edges which are no more than 1/32 inch, and preferably no more than 1/64 inch, inside the edge of the attached liner 20. Further, when the liner 20 is pressed against the adhesive 17, typically shortly after the adhesive 17 is applied to the paper web 10, the adhesive 17 can spread out toward the sides so that the minimal gap along the sides of the liner 20 will be even less than 1/32 in or 1/64 inch in the assembled form.

After the paper web-adhesive-liner composite is formed, the composite travels to die station 24 where a cutting device cuts labels 26 from the paper face. Such cuts are preferably complete die cuts around the labels 26, in which case the labels 26 are held in place by the adhesive on the liner, but the cuts can also leave small ties between the labels 26 and the remainder of the paper web 10 to further secure the releasable labels 26 to the form.

A cutting station 28 at the end of the line either cuts a transverse perforation 29 at spaced locations to define individual sheets between the perforations 29 or fully cuts across the web to define individual cut sheets.

As a consequence of this first preferred method of construction, a reliable manufacturing process produces a business form that is economical and visually pleasing. Since there are no loose edges of the release liner which could tear or fold over, forms made by the present method will reliable feed through printers and the like during use without jamming or sticking. In this respect, it has also been found that forms produced by this process have a reduced tendency to curl and therefore lay flat. Such characteristics of the produced forms not only give the forms the desired appearance but they also enhance the reliability of the form to move through a printer or other processing machine. Uneven printing such as can occur on wrinkled or wavy forms is therefore avoided, as are paper jams potentially resulting from the greater effective thickness of wrinkled forms.

In a second preferred embodiment of the invention, the adhesive 17 is applied to the paper web 10 in a width at least substantially equal to, or even greater than, the width of the liner 20. In this embodiment, as with the first embodiment, adhesive 17 will at least extend substantially to the edge of the liner 20 and in some places may actually extend beyond the liner 20. Certainly there would be exposed adhesive if the adhesive 17 is applied at a greater width than the liner 20, and exposed adhesive might also appear at some areas along the edge of the liner 20 even where the adhesive 17 is substantially equal in width to the liner 20 if, for example, adequate manufacturing tolerances are not maintained or adhesive 17 spreads out beyond the side of the liner 20 when the liner is applied against it. In either case, of course, the previously discussed advantageous full width adhesion of the liner 20 to the paper web 10 would be obtained.

With this second embodiment, a suitable adhesive neutralizer is used to neutralize or deaden any sticky adhesive 17 exposed along the edge of the liner 20. While the particular neutralizer chosen can depend on the particular pressure sensitive adhesive 17 being used, one suitable method of neutralizing or deadening the sticky characteristic of pressure sensitive adhesives is through the use of a deadening material and ultra violet (UV) light, such as is generally known in the art. It will become clear from a full understanding of this embodiment, however, that still other deadening methods could be used within the scope of this embodiment.

An apparatus for practicing this method in connection with the business form of the second embodiment of the present invention is illustrated in FIG. 6. In this preferred embodiment, the neutralizing apparatus is located downstream from where the release liner 20 is applied to the paper web 10. A printing plate 32 of the apparatus collects suitable UV deadening ink 30 from a suitable source such as schematically indicated at reference no. 34. One form of this UV ink that is known to work for most conventional pressure sensitive adhesives is UV Deadener No. UF 170050, which is available from Environmental Inks and Coatings Corporation, 1785 Armitage Court, Addison, Ill. 60101. The printing plate 32 applies that ink 30 to the exposed portions of the ink (that is, the wider portions of the band of adhesive 17 which extend beyond the sides of the release liner 20). That combination of adhesive 17 and ink 30 is then cured by a suitably intense ultra-violet light. Such light can be provided, for example, by two ultra-violet (UV) bulbs 36 each having 300 watts/square inch. Although a single bulb can cure the deadener, two bulbs are preferred since they provide a more complete and faster curing process where such curing is being done adjacent opposite edges of the liner 20, and therefore allow the press to run at a higher speed.

Business forms produced in this manner thus not only have the many advantages provided by the first described embodiment, but also enhance those advantages, For example, this method further ensures that the adhesive 17 between the paper web 10 and liner 20 extends fully to the edge of the liner 20, thereby completely adhering the liner without loose edges which could tear or bend. As previously noted, such torn or bent edges not only give the business form a sloppy appearance, but can interfere with proper feeding and/or print on the form itself. Further, the deadened adhesive can serve to block the non-deadened adhesive from leaking out the side of the gap between the paper web 10 and liner 20 (see FIG. 4). Therefore, in hot conditions as sometimes occur in printers there is a barrier which prevents the sticky adhesive from melting out and being exposed to, and gum up, printer components. Still further, this area of deadened adhesive can serve as a transitional area between the single paper ply 10 outside this area and the three element composite (paper web-adhesive-release liner). This can in some instances to assist with feeding of the form, and result in fewer paper jams, because the bump which the printer encounters is less abrupt.

It should also be understood that the second described embodiment (in which the adhesive extends beyond the edge of the release liner and is then neutralized in that area) could also be used in business forms in which the release liner is not continuous, that is, in which discrete patches of release liner are only tipped on a business form as might be desired, for example, where only one label is desired on the form. In such instance, the adhesive would typically be applied in a printing type procedure (versus a brush-on type application as would preferably be used with the full length adhesive of the first embodiment), and such adhesive would be deadened around all four sides. The business form resulting from such procedures would provide the previously described advantages. In fact, the provision of a transition area would be particularly significant in such business forms since the bump from the increased thickness at the wide leading edge of such a patch is particularly susceptible to causing paper jams or misfeeding in printers.

A variation which can be used with the above embodiments is to leave selected areas between the paper web and the release liner with gaps of no adhesive.

With one such variation, for example, a substantially continuous band of adhesive and release liner can be used such as described in connection with FIGS. 1–6, but a rectangular area within the adhesive band may be left free of adhesive. With such a structure, not only can the business form be provided with removable labels such as previously discussed, but a perforation can be cut in the paper web over the rectangular area with no adhesive to define a card which may be removed from the form. In such a business form, the release liner underlying the removable card provides stability to the form after the card is removed, thereby not only helping to ensure that the form does not tear but also helping to ensure that the form can still be properly handled by a printer or the like should the business form require such further handling after removal of the card.

With another such variation, a longitudinally extending gap can be provided in the adhesive 17, with the label die cut so that one side is aligned with the gap. This could be easily accomplished by simply leaving a gap between the edges of the applied adhesive 17 with embodiments in which the adhesive is brushed on, as would be preferable with the first embodiment with adhesive extending the full length of the forms. With such a structure, one side edge of the die cut label would not be adhered to the underlying liner 20, to facilitate easy removal of the label when desired. Further, this easier removal of the label would allow the person removing the label to do so without excessively bending the form to grasp an edge, with the further advantage then being that the form will be more likely to lie flat even after it is handled to remove the label.

Still other aspects, objects, and advantages of the present invention can be obtained from a study of the specification, the drawings, and the appended claims.

We claim:

1. A method of manufacturing a business form having at least one removable adhesive label, the method including the steps of: (1) adhering a continuous release liner to a portion of one side of a continuous web with a continuous band of pressure sensitive adhesive therebetween, with said band of adhesive having a width less than the width of the web and said release liner having a width substantially equal to the width of said band of adhesive; (2) neutralizing adhesive on the web extending beyond the width of the release liner; (3) die cutting labels in the web in the portion of the web to which the release liner is adhered; and (4) transversely cutting the web and liner to define individual business forms.

2. The method of claim 1 wherein the release liner of step (2) has an adherence to the adhesive significantly less than to the web.

3. The method of claim 1 wherein gaps are left free of adhesive along said continuous band of adhesive, and step (3) further comprises cutting a perforation in the web to define a removable card therein.

4. The method of claim 1 wherein said release liner has side edges and in step (2) the release liner is applied so that said adhesive extends to within at least 1/32 inch from each release liner side edge.

5. The method of claim 4 wherein in step (2) the release liner is applied so that said adhesive extends to within at least 1/64 inch from each release liner side edge.

6. The method of claim 1, wherein a UV deadener is applied along the sides of the release liner and the neutralizing step further comprises the step of exposing the deadener to ultra-violet light of an intensity sufficient to eliminate the adherence of the adhesive to which the deadener was applied.

7. The method of claim 1 wherein:

step (1) applies side-by-side continuous bands of adhesive with a gap therebetween;

step (2) applies a single release liner over both said side-by-side bands and said gap therebetween; and step (3) die cuts labels in the web so that one side of at least one label overlies said gap whereby said label one side has no adhesive thereon.

8. A method for manufacturing a business form having at least one removable adhesive label, the method including the steps of: (1) applying a continuous band of pressure sensitive adhesive to one side of a portion of a web, said band of adhesive having a width less than the width of the web; (2) applying a continuous release liner to said web at the band of adhesive, said release liner having a width substantially no greater than the width of the band of adhesive; (3) neutralizing adhesive on the web extending beyond the width of the release liner; (4) die cutting labels in the portion of the web; and (5) transversely cutting the web and liner to define individual business forms.

9. The method of claim 8 wherein the release liner of step (2) has an adherence to the adhesive significantly less than to the web.

10. The method of claim 8 wherein step (3) is performed after step (2) and includes the step of applying a deadener to the adhesive not covered by the release liner.

11. The method of claim 10, wherein the deadener is a UV deadener, and step (3) further comprises the step of exposing the deadener to ultra-violet light of an intensity sufficient to eliminate the adherence of the adhesive to which the deadener was applied.

12. The method of claim 8 wherein gaps are left free of adhesive along said continuous band of adhesive, and step (4) further comprises cutting a perforation in the web to define a removable card therein.

13. The method of claim 8 wherein said release liner has side edges and in step (2) the release liner is applied so that along the continuous length of said release liner no more than 1/32 inch on each release liner side edge extends beyond the adhesive band when the release liner is applied to the web.

14. The method of claim 13 wherein in step (2) the release liner is applied so that along the continuous length of said release liner no more than 1/64 inch on each release liner side edge extends beyond the adhesive band when the release liner is applied to the web.

15. The method of claim 8 wherein:

step (1) applies side-by-side continuous bands of adhesive with a gap therebetween;

step (2) applies a single release liner over both said side-by-side bands and said gap therebetween; and step (4) die cuts labels in the web so that one side of at least one label overlies said gap whereby said label one side has no adhesive thereon.

16. A method for manufacturing a business form having at least one removable adhesive label, the method including the steps of: (1) applying pressure sensitive adhesive to an area on one side of a portion of a web; (2) applying a release liner to said web at the area of adhesive, wherein said adhesive area is at least substantially equal in size to the area of the applied release liner; (3) neutralizing adhesive on the web extending beyond the applied release liner; (4) die cutting labels in the portion of the web; and (5) transversely cutting the web and liner to define individual business forms.

17. The method of claim 16 wherein the release liner of step (2) has an adherence to the adhesive significantly less than to the web.

18. The method of claim 16 wherein step (3) is performed after step (2) and includes the step of applying a deadener to the adhesive not covered by the release liner.

19. The method of claim 18, wherein the deadener is a UV deadener, and step (3) further comprises the step of exposing the deadener to ultra-violet light of an intensity sufficient to eliminate the adherence of the adhesive to which the deadener was applied.

20. The method of claim 16 wherein said adhesive is applied in a continuous band and said release liner is continuous.

21. The method of claim 16 wherein the release liner has edges and in step (2) the release liner is applied so that said adhesive area extends to within at least 1/32 inch of said release liner edges.

22. The method of claim 21 wherein in step (2) the release liner is applied so that said adhesive area extends to within at least 1/64 inch of said release liner edges.

23. The method of claim 16 wherein:

step (1) applies side-by-side continuous bands of adhesive with a gap therebetween;

step (2) applies a single release liner over both said side-by-side bands and said gap therebetween; and step (4) die cuts labels in the web so that one side of at least one label overlies said gap whereby said label one side has no adhesive thereon.

* * * * *